July 9, 1935. J. W. MILNOR Re. 19,640

BALANCING OCEAN CABLE

Original Filed June 28, 1932

*INVENTOR*
J. W. MILNOR

Eugene C. Brown
*ATTORNEY*

Reissued July 9, 1935

Re. 19,640

UNITED STATES PATENT OFFICE 19,640

BALANCING OCEAN CABLE

Joseph W. Milnor, Maplewood, N. J., assignor to The Western Union Telegraph Company, New York, N. Y., a corporation of New York Original No. 1,941,102, dated December 26, 1933, Serial No. 619,793, June 28, 1932. Application for reissue March 13, 1935, Serial No. 11,181

12 Claims. (Cl. 178—63)

Figure 1:
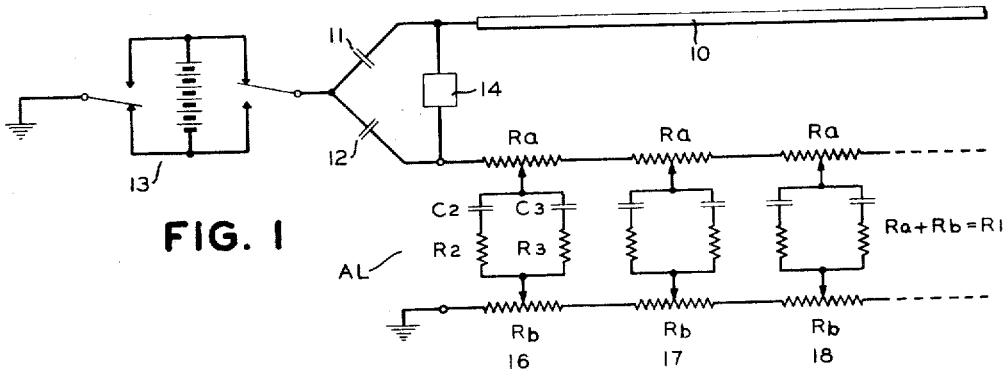

This invention relates to a submarine cable system and to a method of and means for balancing a long submarine telegraph cable by artificial line networks.

It relates particularly to the balancing of a non-loaded submarine cable for duplex operation but is applicable to any type of long cable, either loaded or non-loaded.

In my prior United States Patent No. 1,519,870, granted December 16, 1924, I disclosed a simple resistance-capacity artificial line network for balancing non-loaded cables which can be adjusted to accurately simulate the resistance, capacity and inductance of a cable, provided these factors do not vary with frequency. Actually they do vary with frequency in the real cable even at slow signaling speeds and in practice such variations with frequency may be approximately simulated, in the network of the aforesaid patent, by introducing certain irregularities in the network to provide a compromise adjustment. There is, however, a definite limit to the accuracy of the balance which may be obtained with this and similar types of artificial line networks, particularly for the higher frequency components of the telegraph signals.

In a later patent granted jointly to myself and W. D. Cannon, No. 1,815,629, dated July 21, 1931, there is shown a number of artificial line networks involving the use of inductance coils. These networks were developed to overcome the limitations of the networks of said earlier patent and if properly proportioned they have the characteristics of a smooth line, accurately matching the actual cable both in impedance and propagation constant throughout a wide range of frequency. These networks are somewhat complicated and expensive, however, and the refinement thereof are in many cases not required.

One of the objects of the present invention is, therefore, to produce an artificial line network which will enable a materially improved duplex balance to be obtained, as compared to that obtainable with the ordinary form of resistance-capacity networks, but with small increase in the complexity or expense of the balancing equipment.

Another object is to produce an artificial line network of simple form which will provide an accurate balance for the impedance of the cable, simulating the variations in the resistance and inductance of the cable with frequency, over the signaling range.

Other objects and advantages of the invention will hereinafter appear.

The current flow in a submarine cable system returns in the armor wires and in the water surrounding the cable. The impedance of a non-loaded submarine cable of approximately uniform structure throughout its length involves principally the direct current resistance and the fixed inductance of the cable, the cable capacity, the alternating current resistance and inductance of the cable which are variable with frequency, and of lesser importance, the dielectric absorption. The variation of the resistance and inductance with frequency may be designated the "sea return effect" and is due to the fact that while the very low frequency components of the return current spread out through a relatively wide area of the sea water, the higher frequency components of the current are crowded into a smaller area, current above a certain frequency being practically all confined to the armor wires of the cable as a return path.

The various networks described hereinafter, when elements of the proper value are used therein, accurately simulate the "sea return effect" and other electrical properties of non-loaded cables and with somewhat less accuracy the propagation constant. In the theory subsequently developed, it is assumed that the cable capacity is constant with frequency and that the dielectric losses are negligible. In practice these losses are not entirely negligible but they are small and may be compensated by adding special networks to balance the same, as shown in the aforesaid Patent No. 1,815,629, or they may be balanced by making slight alterations in the values of the elements of these networks. If the cable is of uniform structure throughout its length, that is, if there are no large irregularities at which reflections may take place, the propagation constant may be neglected without serious error.

Figure 6:
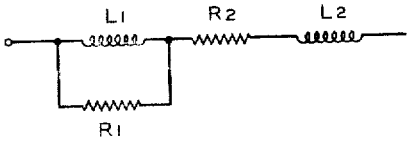

In accordance with the present invention I prefer to employ a five element network which, in one embodiment, may consist entirely of capacity and resistance, or in another embodiment may possess series inductance. While the various elements of the network interact to produce the duplex balance, it may be stated in general that the direct current resistance is balanced by a series resistance element in the artificial line, the capacity is mainly compensated by a plurality of shunt capacity elements in combination, and the fixed inductance and the variable resistance and inductance are simulated by the interaction of the series resistance and the plurality of shunt paths, the shunt paths being the more important factor in this simulation. In some cases a fixed inductance may be included in the series path. These general properties can be best expressed in their specific relations by means of mathematical formulæ, which will be developed in this specification, in connection with the accompanying drawing, in which:

Figure 1 is a diagrammatic illustration of a cable terminal provided with an artificial line embodying my invention;

Figures 2 to 5, inclusive, illustrate alternate forms of networks for simulating the characteristics of ocean cables, including the sea return effects; and Figure 6 illustrates a basic type of network used heretofore for balancing ocean cables.

Referring first to Figure 1, I have shown a conventional submarine cable 10 terminating in the usual manner for duplex working, the cable being connected to the arms of a Wheatstone bridge provided with condensers 11 and 12. A transmitter 13 is connected between the junction of the bridge arms and ground, and the receiving apparatus 14 is connected across conjugate terminals of the bridge. The artificial line AL provides a balance for the cable so as to prevent transmitted signals from affecting the local receiver.

The artificial line is divided into a number of sections 16, 17, 18, etc., each simulating the electrical properties of a definite length of cable. To facilitate the adjustment of the elements of the artificial line networks, I divide the series resistance of each section into two parts, $R_a$ and $R_b$, the former being on the line side and the latter on the ground side of the artificial line. The capacity of the artificial line is provided by two condensers $C_2$ and $C_3$ connected between points in the opposite resistances $R_a$ and $R_b$. Resistances $R_2$ and $R_3$ are included in series with the condensers $C_2$ and $C_3$ respectively. One of the condensers, for instance $C_3$ is of relatively large capacity and in combination with the smaller capacity $C_2$ balances the capacity of the cable. The two shunt paths $C_2$, $R_2$ and $C_3$, $R_3$ and the resistances $R_a$ and $R_6$, by their interaction serve to balance the fixed inductance, and also that part of the resistance and inductance which vary with frequency.

The dielectric losses of the cable are not completely balanced by the network shown but may be substantially balanced by adding additional resistance-capacity shunt paths as described in Patent No. 1,815,629, referred to above.

Figure 2:
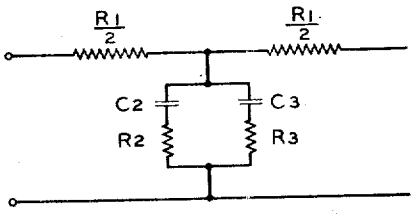

The network of Figure 2 is similar to that of Figure 1 except that all of the series resistance has been included in the line side. This arrangement is somewhat simpler than the network of Figure 1 but ordinarily is less desirable in operating practice.

It should be noted that the networks of Figures 1 and 2, despite the fact that they balance with sufficient accuracy the variations of inductance and resistance of the cable, within the frequency range involved, do not include any inductance coils.

Figure 3:
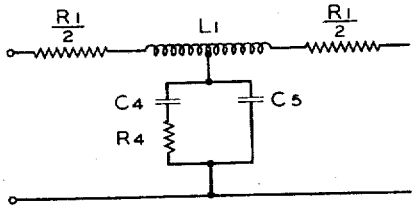

In Figure 3 the resistance shown in series with one of the shunt condensers in the previous networks, has been omitted and an inductance coil $L_1$ has been inserted serially in the artificial line to assist in balancing the fixed inductance of the cable. In this modification the shunt capacity and capacity-resistance paths are connected across the two sides of the artificial line at approximately the midway point of the coil $L_1$, the two halves of which are mutually coupled. The two shunt paths in combination again balance the major portion of the variable inductance and resistance of the cable.

Figure 4:
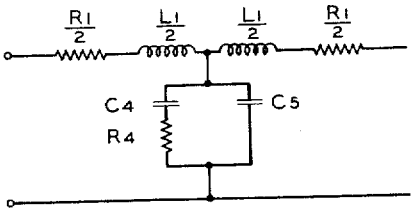

In Figure 4 a similar network is shown in which separate inductance coils are used, the sum of their inductances being equal to the inductance $L_1$ of Figure 3.

Figure 5:
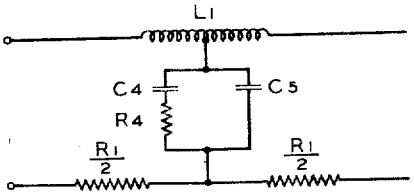

Figure 5 shows a network similar to that of Figure 3 except that the series resistance and inductance are included in opposite sides of the artificial line. This arrangement may provide a more convenient construction in some instances but does not alter the electrical characteristics of the network.

For the purpose of illustration, complete calculations for the networks of Figures 3, 4 and 5 are given below to show mathematically the close simulation of the real cable properties with these general types of networks, and to give the equations for obtaining the values of the elements of the networks in terms of measured properties of the cable.

The complete expression for the characteristic or surge impedance of a non-loaded cable, including the sea return impedance, is a highly complicated function of the frequency. In practice, however, it has been found that this impedance can be represented with sufficient accuracy for most cables by an empirical expression which may be derived as follows: The well known general equation for the surge impedance of a cable is $$Z=\sqrt{\frac{R+j\omega L}{G+j\omega C}}$$

in which the expression $$R+j\omega L$$

represents the linear resistance and reactance of the copper conductor and sea return path, and the expression $$G+j\omega C$$

represents the leakage and capacity reactance of the insulating material where

R=resistance
L=inductance
G=leakage
C=capacity
$\omega=2\pi$ times the frequency $$j=\sqrt{-1}$$

As previously stated both R and L vary somewhat with frequency.

In Figure 6 I have shown an artificial line network copied from the prior Patent No. 1,815,629, the impedance of which, using the symbols shown on the drawing is:

$$Z_1=\frac{j\omega L_1R_1}{R_1+j\omega L_1}+R_2+j\omega L_2 \qquad (1)$$

This network was shown in said patent to closely approximate the $R+j\omega L$ term in the equation for surge impedance. Equation (I) may be rewritten as follows:

$$Z_1=R_2\frac{(1+j\omega A-\omega^2B)}{(1+j\omega D)} \qquad (2)$$

where $$A=\frac{L_2+L_1}{R_2}+\frac{L_1}{R_1}$$

$$B=\frac{L_1L_2}{R_1R_2}$$

$$D=\frac{L_1}{R_1}$$

Substituting the value of $Z_1$ in the equation for the surge impedance, the equation becomes, if leakage is omitted, $$Z=\sqrt{R_2\frac{(1+j\omega A-\omega^2 B)}{(1+j\omega D)}\times\frac{1}{j\omega C}} \quad (3)$$

Equation (3) is a close approximation of the impedance characteristics of a submarine cable providing the constants A, B, C, D and $R_2$ are correctly chosen. These values can be computed from the quantities of the network of Fig. 6, which were originally based upon the measured cable parameters. It is obvious that any network, the impedance of which can be expressed in the form of Equation (3) can also be made substantially equivalent to the cable.

It will now be shown that the impedance of the network of Fig. 3, for instance, is of the form of Equation (3).

The impedance $Z_2$ of the network of Figure 3 is given by the equation:

$$Z^2_2=R_1\left[\frac{1+j\omega\left(C_4R_4+\frac{C_4R_1}{4}+\frac{L_1}{R_1}+\frac{C_5R_1}{4}\right)}{j\omega(C_5+C_4+j\omega C_5C_4R_4)}-\frac{\omega^2\left(\frac{C_4R_4L_1}{R_1}+\frac{C_4L_1}{4}+\frac{C_5L_1}{4}+\frac{C_5R_1C_4R_4}{4}\right)+\frac{j\omega^3C_5C_4R_1L_1}{4}}{j\omega(C_5+C_4+j\omega C_5C_4R_4)}\right]$$

If this network be designed to match a section of cable of length "$m$", the above equation becomes:

$$Z^2_2=mR_1\left[\frac{1+j\omega\left(C_4R_4+\frac{C_4R_1m^2}{4}+\frac{L_1}{R_1}+\frac{C_5R_1m^2}{4}\right)}{j\omega m(C_5+C_4+j\omega C_5C_4R_4)}-\frac{\omega^2\left(\frac{C_4R_4L_1}{R_1}+\frac{C_4L_1m^2}{4}+\frac{C_5L_1m^2}{4}+\frac{C_5R_1C_4R_4m^2}{4}\right)+\frac{j\omega^3C_5C_4R_4L_1m^2}{4}}{j\omega m(C_5+C_4+j\omega C_5C_4R_4)}\right]$$

but if the sections are made quite small, the terms in $m^2$ can be neglected; hence:

$$Z^2_2=R_1\left[\frac{1+j\omega\left(C_4R_4+\frac{L_1}{R_1}\right)-\omega_2\frac{C_4R_4L_1}{R_1}}{j\omega(C_5+C_4+j\omega C_5C_4R_4)}\right]$$

or $$Z_2=\sqrt{\frac{(1+j\omega M-\omega^2N)}{(1+j\omega P)}\times\frac{R_1}{j\omega C}} \quad (4)$$

The terms M, N, P and C correspond to the terms A, B, D, and C respectively of equation (3) and have the following values $$M=C_4R_4+\frac{L_1}{R_1} \quad (5)$$

$$N=\frac{C_4R_4L_1}{R_1} \quad (6)$$

$$P=\frac{C_4C_5R_4}{C_4+C_5} \quad (7)$$

$$C=C_4+C_5 \quad (8)$$

Equation (4), it is seen is identical in form with Equation (3) and therefore possesses impedance characteristics simulating those of the cable if M, N and P are made equal to A, B and D, respectively. If the notations A, B and D be substituted for M, N and P in the above equations and the four equations solved simultaneously, the values for $C_4$, $C_5$, $R_4$ and $L_1$ will be found to be $$C_4=\frac{C(2B-AD\mp D\sqrt{A^2-4B})}{2B} \quad (9)$$

$$C_5=\frac{CD(A\pm\sqrt{A^2-4B})}{2B} \quad (10)$$

$$R_4=\frac{2B^2}{C[AB-A^2D+2BD+(\pm B\mp AD)\sqrt{A^2-4B}]} \quad (11)$$

$$L_1=\frac{R_1}{2}(A\pm\sqrt{A^2-4B}) \quad (12)$$

This group of four Equations 9, 10, 11 and 12 gives the values of the resistances, inductances and capacities to build the network of Figure 3. The values, however, are expressed in terms of A, B, D, C and $R_1$, of which the last two terms can be measured directly from the cable, but the synthetic parameters A, B and D must be determined from Equation (1) which, it has been pointed out, represents the impedance of a basic network equivalent to certain properties of the cable. With these five parameters, however, the values of $L_1$, $R_1$, $C_4$, $C_5$ and $R_4$ for constructing the network of Figure 3 can be determined. Therefore, it is possible to balance the impedance of a cable with an artificial line constituted of sections of the type of Fig. 3, and a method for computing the values has been given.

As has been previously pointed out, the networks of Figs. 4 and 5 are equivalent to that of Fig. 3, embodying only a rearrangement of some of the elements in the circuit. Since the same symbols are used, Equations 9, 10, 11 and 12 are directly applicable.

The networks shown in Figures 1 and 2 can be expressed by an equation of similar form to Equation (4) from which the values M, N, P and C can be determined in terms of capacity, resistance and inductance and from which the values for the elements $R_1=R_a+R_b$; $R_2$, $R_3$ $C_2$ and $C_3$, can be computed. These equations have not been developed in detail herein, but the values of M, N, P and C and of $R_2$, $R_3$, $C_2$ and $C_3$ as determined from such equations for the networks of Figures 1 and 2 are as follows:

$$M=(C_2R_2+C_3R_3) \qquad R_2=\frac{A\pm\sqrt{A^2-4B}}{2C_2}$$

$$N=(C_2C_3R_2R_3) \qquad R_3=\frac{A\mp\sqrt{A^2-4B}}{2(C-C_2)}$$

$$P=\left[\frac{C_2C_3}{C_2+C_3}(R_2+R_3)\right] \qquad C_2=C\left[\frac{2D-A\mp\sqrt{A^2-4B}}{\mp2\sqrt{A^2-4B}}\right]$$

$$C=C_2+C_3 \qquad C_3=C-C_2$$

Obviously various other arrangements of networks can be devised embodying the principles described herein, which will closely simulate the electrical properties of the cable, and, therefore, I do not desire to be limited to the particular forms shown and described but contemplate all types of elemental networks utilizing the principles set forth.

What I claim is:

1. An artificial line network adapted to balance a submarine cable over a range of frequencies, comprising a plurality of sections, each section including series resistance and a plurality of shunt paths, said shunt paths in combination with the series path serving to balance the resistance and inductance of the cable together with their variations with frequency.

2. An artificial line network adapted to balance a section of submarine cable over a range of frequencies comprising series resistance and a plurality of shunt paths one of which includes a capacity element for balancing the major portion of the cable capacity and the other of which contains series capacity and resistance and adjusted to balance in combination with the series path and the first shunt path the variations of the resistance and inductance of the cable section with frequency.

3. An artificial line network adapted to balance a section of submarine cable over a range of frequencies comprising series resistance, and a plurality of shunt paths, one of which includes a capacity element for balancing the major portion of the cable capacity and another of which contains series capacity and resistance and adjusted in combination to balance primarily the variations of the resistance and inductance of the cable section with frequency, and an additional element for balancing the major portion of the fixed inductance of the cable section.

4. An artificial line network for balancing a section of submarine cable over a range of frequencies comprising series resistance and a plurality of capacity-resistance shunt paths, adjusted in combination with the series path to compensate for the capacity, constant resistance and inductance, and the frequency variable resistance and inductance of the section.

5. An artificial line network for balancing a section of ocean cable comprising five elements consisting of resistance and capacity only, said elements being arranged and adjusted to balance the variations in impedance of the cable with frequency.

6. An artificial line network for balancing a section of ocean cable over a range of frequencies comprising a series resistance for balancing the major portion of the fixed resistance of the cable section and a plurality of shunt paths including capacity and resistance only for balancing the capacity and the major portion of the constant inductance and frequency variable inductance and resistance of the cable section.

7. An artificial line network for balancing a section of ocean cable over a range of frequencies comprising a series resistance for balancing the fixed resistance of the cable section and shunt paths including capacity and resistance only for balancing the frequency variable inductance and resistance of the section.

8. An artificial line network adapted to balance a section of ocean cable over a range of frequency comprising series resistance and a plurality of shunt paths, one of said shunt paths balancing the major portion of the capacity of the cable section and the two shunt paths in combination with the series path balancing the variations of the resistance and inductance of the cable section with frequency.

9. An artificial line network for balancing a section of submarine cable over a range of frequencies comprising five elements including series resistance and inductance adjusted to balance the major portion of the fixed resistance and inductance of the cable section, and a plurality of shunt paths, one containing capacity of a value substantially equal to the capacity of the cable section and the other consisting of capacity and resistance adjusted to balance the remainder of the cable capacity and by interaction with said first path and the series path to balance the variations of the resistance and inductance of the section with frequency.

10. In an artificial line adapted to balance a submarine cable which possesses capacity, and also resistance and inductance which vary over a signaling frequency range, the combination of a series resistance path and a plurality of shunt paths, the shunt paths being adapted to balance the capacity and also the major portion of the frequency variable inductance and resistance of the cable.

11. An artificial line network adapted to balance a section of ocean cable over a range of frequency comprising series inductance with a plurality of shunt paths connected to the approximate mid-point of said inductance, said shunt paths being adapted to simulate the capacity and substantially all of the variable resistance and inductance of the cable.

12. In an artificial line adapted to simulate a section of submarine cable which possesses capacity, inductance, and resistance and also resistance and inductance which vary over a signaling range, a series path and a plurality of shunt paths containing capacity, with resistance in at least one path, the sum of the capacities simulating the capacity of the cable, while the shunt paths in combination simulate substantially all of the variable inductance and resistance of the cable.

JOSEPH W. MILNOR.